United States Patent [19]

Onishi et al.

[11] Patent Number: 4,729,742

[45] Date of Patent: Mar. 8, 1988

[54] ELECTRIC POWER DISTRIBUTION TRACK

[75] Inventors: Isao Onishi, Moriguchi; Hiromi Kinoshita, Kadoma; Masatoshi Nishizawa, Ishioka, all of Japan

[73] Assignee: Matsushita Electric Works, Ltd., Japan

[21] Appl. No.: 899,780

[22] Filed: Aug. 22, 1986

Related U.S. Application Data

[63] Continuation of Ser. No. 694,792, Jan. 25, 1985, abandoned.

[30] Foreign Application Priority Data

Jan. 25, 1984 [JP] Japan .................................. 59-12239
Jan. 25, 1984 [JP] Japan .................................. 59-12240

[51] Int. Cl.$^4$ ................................................ H02G 5/08
[52] U.S. Cl. ........................................ 439/208; 439/94
[58] Field of Search ................. 339/22 R, 22 B, 21 R, 339/14 R, 14 L, 21 S, 20, 22 T; 174/68 B, 99 B

[56] References Cited

U.S. PATENT DOCUMENTS 3,273,103 9/1966 Ericson .
3,345,471 10/1967 Kilburg ............................. 339/22 R
3,422,387 1/1969 Sprigings et al. ................. 339/14 R
3,546,367 12/1970 Hart et al. ......................... 339/21 R
3,601,749 8/1971 Hart et al. .
3,603,918 9/1971 Woertz ............................. 339/14 R
3,683,312 8/1972 Routh et al. .
3,704,437 11/1972 Hesse ................................. 339/22 B
3,757,273 9/1973 Hesse .
4,108,523 8/1978 Bolis ................................... 339/22 B
4,137,424 1/1979 Hesse et al. ....................... 339/21 R
4,217,018 8/1980 Yoshida et al. ................... 339/21 R
4,218,108 8/1980 El Mouchi .

*Primary Examiner*—Gil Weidenfeld
*Assistant Examiner*—Thomas M. Kline
*Attorney, Agent, or Firm*—Stevens, Davis, Miller & Mosher

[57] ABSTRACT

An improved electric power distribution track comprises a metal-reinforced duct and at least three conductors extending along the length thereof. The duct is shaped to have a top wall, a pair of lateral sidewalls and a lengthwise bottom opening, and is composed of a correspondingly shaped metal-made core channel member covered by an insulation sheath of a plastic material. Three conductors are disposed on the inner sheath in a trigonous arrangement with one of the conductors on the top wall and the two others on the opposite sidewalls. Integrally projecting from the corresponding portions of the inner sheath are support members for holding the respective conductors at positions spaced inwardly from the inner periphery of the sheath. The support member on the top wall is connected to those on each of the sidewalls by a connection rib integrally extending therebetween for reinforcing the support members by one another to thereby retain the conductors held thereby in positions. Each connection rib extends between the adjacent ones of the support members in a non-linear manner.

11 Claims, 12 Drawing Figures

ELECTRIC POWER DISTRIBUTION TRACK

This application is a continuation of application Ser. No. 694,792, filed Jan. 25, 1985, now abandoned.

BACKGROUND OF THE INVENTION

1. Field of the Invention

The present invention is directed to an electric power distribution track for various power consuming loads such as lighting fixtures and other electric devices, and more particularly to an electric power distribution track of the type comprising a metal-reinforced plastic duct and at least three conductors which extend along the length of the duct at positions spaced inwardly from the inner periphery of the plastic duct and are held by respective supporting members integrally projecting on the top wall and the opposite sidewalls to form a trigonous arrangement of the conductors at any cross section of the duct.

2. Related Prior Art

Electric power distribution tracks having a metal-reinforced plastic duct are known, for example, as disclosed in U.S. Pat. No. 3,704,437, which comprises a metal-reinforced plastic section which carries several electric conductors on its inner periphery of the plastic duct. However, there is no provision of holding the conductors on the top wall and the opposite sidewalls of the plastic duct respectively by support members projecting inwardly from the insulation sheath of the duct.

In the meanwhile, the above trigonous arrangement of the conductors is advantageous in that the three conductors can be selectively utilized as forming a three-phase current distribution circuit or as forming two independent circuits carrying a single-phase three-wire current. Apart from the above, it is preferable for the metal-reinforced plastic duct including a metal core covered by an insulation sheath of the plastic material to separate the conductors from the metal core by a distance great enough to prevent accidental shorting therebetween due to possible defect or breakage of the insulation sheath as well as to elongate as much as possible the creepage distance of insulation at an exposed end face of the track.

To these ends, it may be reasonable to integrally project the supporting members holding the respective conductors in spaced relation from the inner periphery of the duct, or from the top wall and the sidewalls. However, this attempt certainly induces another problem that increasing the amount of projection of the support member results in the loss of rigidity of the support member and therefore the support member as well as the conductor held thereby become unstable to such an extent that proper contacting engagement is no more expected between the conductor and a cooperative terminal blade of an adaptor plug through which the electric device derives the power from the track, in addition to that, misalignment occurs between the conductors of the adjacent tracks at the time of coupling the lengths of the tracks.

One solution to the above is thought to provide suitable ribs each integrally bridging between the support member on the top wall and that on each of the sidewalls within the confines of the track for joining the three support members into a consolidated unit. But, there still remains a further problem in this scheme that the rib of a certain configuration, for example, the one extending straight will result in excess reinforcing effect to permanently retain the three support members in a fixed trigonous relationship even if the duct or track be subjected to such an external force to spread outwardly the sidewalls and the support member thereon as might be seen at the time of dropping the track onto the floor. This may adversely cause the unacceptable separation of the inner sheath at the top wall, from the core member to which it has been adhered, since the consolidated unit of three support members would act as a rigid construction member absorbing substantially no stress attendant with the above external force and consequently pull the insulation sheath of the top wall downwardly as the sidewalls and the support member thereon are forced to be deformed outwardly in a spreading manner. Such separation of the insulation would lead to the breakage of the insulation sheath and therefore should be unacceptable from the view point of providing an electrically safe track of practical utility.

3. Related Applications

A related application is application Ser. No. 694,852 filed Jan. 25, 1985 by the same applicants entitled "Electric Power Distribution Track" now abandoned.

SUMMARY OF THE INVENTION

The present invention has been devised with a view to overcoming the above problems and presenting an improved electric power distribution track. The track comprises an elongated metal-reinforced plastic duct and a plurality of electrically isolated conductors extending along the length thereof at positions spaced inwardly from the inner periphery of the duct. The duct is outlined to have the cross section of a generally downwardly disposed U-shape with a top wall, a pair of lateral sidewalls, and a lengthwise bottom opening, said duct including a correspondingly shaped metal-made core channel member covered by an insulation sheath of an electrically insulative plastic material. One of the conductors is supported on the top wall and at least one conductor is supported on each of the opposite sidewalls by respective support members integrally projecting from the inner sheath at corresponding walls so that three of the conductors are disposed in a trigonous arrangement at any cross section of the track. Each of the support members projects inwardly from the sheath of the duct and holds the complementary conductor at its inner end portion so as to leave between the core channel member and the conductor a distance great enough to assure proper electric insulation against possible defect or breakage of the insulation sheath and at the same time to elongate the creepage distance of insulation at the exposed end face of the track.

Connecting the support member on the top wall to the adjacent support member on each of the opposite sidewalls is a connection rib which integrally extends therebetween in a non-linear manner such that the connection rib is permitted to resiliently stretch in the direction of becoming linear when the track is subjected to such an external force to deformingly spread the sidewalls outward. With this arrangement of integrally connecting the adjacent ones of the support members by the respective connection ribs of non-linear configuration, the support members can be reinforced by each other to form a consolidated unit which is tough enough for stably sustaining the individual conductors in positions but allows the connection ribs to resiliently spread or deform for absorbing the stress applied thereto when the track is subjected to the external force of spreading outwardly the sidewalls. Thus, the support members on the opposite sidewalls can deform together with the spreading sidewalls to a limited extent without giving any deformative forces to the remaining support member on the top wall and therefore without pulling that support member and the adjacent portion of the insulation sheath downwardly in the direction of separating the insulation sheath from the core member, eliminating the possibility of separating the insulation sheath integrally carrying that support member from the metal core member.

Accordingly, it is a primary object of the present invention to provide an electric power distribution track which is capable of supporting the conductors stably in positions by respective support members integrally projecting inwardly from the plastic insulation sheath covering the metal core member, yet preventing the separation of the insulation sheath from the core member and therefore giving rise to a tough and electrically safe track construction of practical utility.

In preferred forms, said connection ribs are configured into simple but advantageous shapes for assuring the above-mentioned effects, one having the cross section comprises two straight segments integrally extending from each of the adjacent ones of the support members and interconnected by an oblique segment angularly displaced therefrom, and the other comprising an arcuate segment integrally extending between the adjacent ones of the support members.

Each of said conductors is configured into an elongated hollow member with an annular cross section. Thus, the connection between the conductors of the adjacent tracks can be made simply by inserting the opposite ends of connection pins into corresponding holes in the longitudinal ends of the hollow members of the adjacent tracks, at which connection, the inner periphery of each hollow member can serve as an enlarged contacting surface sufficient for electrical connection between the longitudinally adjacent conductors. In addition to the above, the holes in the hollow members cooperate with the connection pins to bring the conductors in exact longitudinal alignment with each other between longitudinally adjacent tracks. Each of of the support members is formed at its inner end portion with a rail of C-shaped cross section with an inwardly oriented slit for firmly receiving therein each conductor, the conductor being exposed to the inside of the duct through the slit so as to define thereat a contacting surface for electrical connection with a destined electric device.

It is therefore another object of the present invention to provide an electric power distribution track of which conductors can be easily and securely connected to each other between the adjacent tracks, and in which the conductors can be easily and firmly held by the respective support members.

Each of the C-shaped rails receiving the conductors joins integrally the insulation sheath through a stem projecting inwardly from the inner surface of the sheath at the respective portions on the top wall and the opposite sidewalls so that the rail is spaced inwardly therefrom by the length of the stem. At the longitudinal or end face portions of the track, each stem is notched to define thereat a recess which serves to further elongate the creepage distance of insulation between the metal core channel member and each of the conductors. With this provision of the recess in each of the stems integrally interconnecting each rail and the insulation sheath, the spacing between the metal core member and the conductors can be reduced to a minimum while assuring enough creepage distance of insulation, which gives rise to a compact construction of the track.

It is therefore a still further object of the present invention to provide an electric power distribution track which can be made compact, yet assure sufficient creepage distance of insulation at the end face portion of the track.

The present invention discloses a further advantageous feature in which a pair of auxiliary conductors are incorporated to extend along the length of the track at positions downwardly displaced from said conductors adjacent the bottom opening of the track as being supported by respective support members also integral with said sheath. These auxiliary conductors are sized to have a smaller cross sectional area than that of said conductors such that the auxiliary conductors form a power distribution circuit of smaller current-carrying capacity while said conductors are cooperative to form a power distribution circuit of larger current-carrying capacity. Consequently, the track can have two independent circuits of different current-carrying capacities, whereby allowing the connection of electric devices of different power or current requirements to the single track.

It is therefore a still further object of the present invention to provide an electric power distribution track which can be conveniently utilized as supplying power to electric devices of different current requirements.

These and other objects and advantageous features of the present invention will be apparent from the following detailed description of the preferred embodiments when taken in conjunction with the accompanying drawings.

DESCRIPTION OF THE PREFERRED EMBODIMENTS

Figure 1:
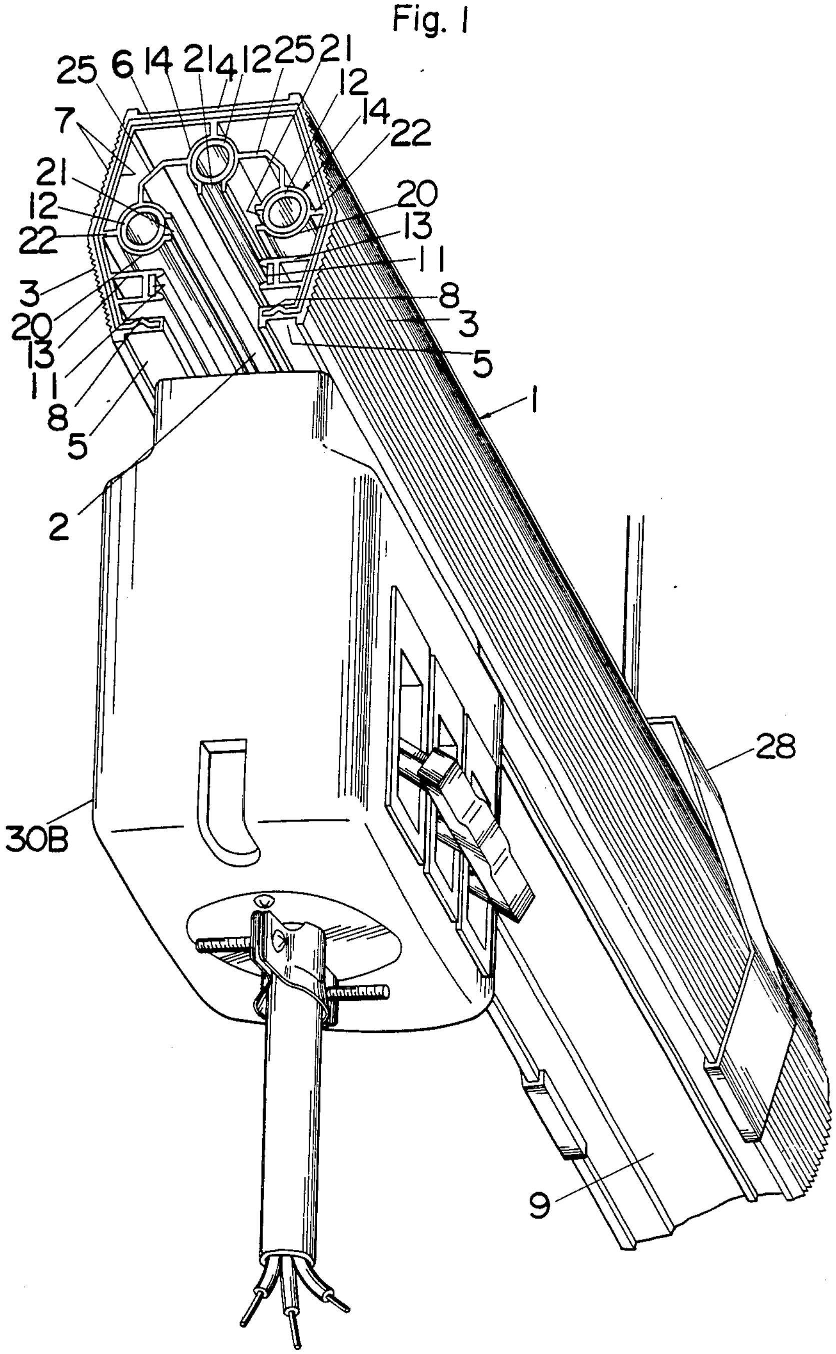
FIG. 1 is a perspective view of an electric power distribution track and an adaptor plug connected thereto in accordance with a first preferred embodiment of the present invention.
Figure 2:
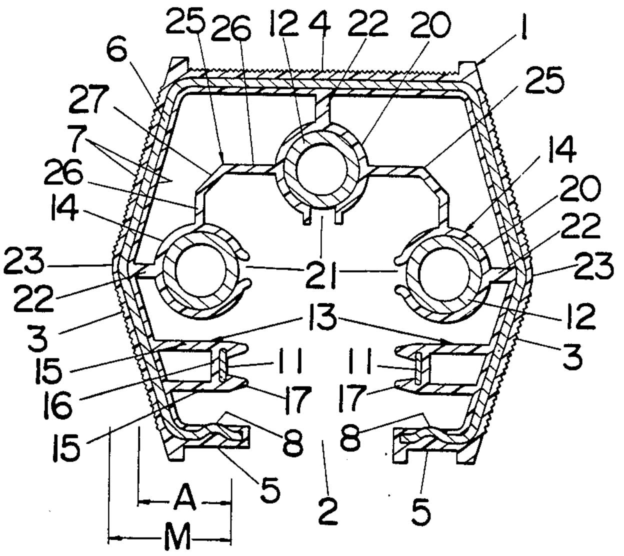
FIG. 2 is a cross section of the above track.

Referring now to FIGS. 1 to 3, there is illustrated an electric power distribution track in accordance with a first preferred embodiment of the present invention. The track is designed to include three lines of main conductors 12 and additionally a pair of auxiliary conductors 11 of a cross section smaller than that of the main conductor 12. The main conductors 12 are cooperative to form one or two main power distribution circuits of a larger current capacity, that is, one circuit for a three-phase current or two independent circuits for a single-phase three-wire current. Likewise, the auxiliary conductors 11 are cooperative to form an auxiliary power distribution circuit of a small current-carrying capacity. These circuits of different current-carrying capacities are selectively utilized as feeding the power to several electric devices depending upon the power or current requirements thereof. For example, the power distribution circuit of larger current-carrying capacity provides for 300 volts, 100 amps suitable for driving commercial motors in machine tools and the like, and the power distribution circuit of smaller current-carrying capacity provides for 250 volts, 30 amps suitable for driving lighting fixtures of a relatively small current requirement. The latter circuit may be utilized for passing remote control signal, as necessary to provide a remote control operation with respect to one or more electric devices coupled to the track.

The track comprises a metal-reinforced plastic duct 1 shaped to have a generally downwardly disposed U-shaped cross section, more precisely, a rather hexagonal cross section with one bottom side of the hexagon removed to define thereat a lengthwise bottom opening 2 and with a pair of sidewalls 3 depending from the opposite ends of a top wall 4, each sidewall 3 composed of two adjacent angularly disposed sides of the hexagon. Formed respectively at the lower ends of the sidewalls 3 are inturned flanges 5 which project toward each other to leave therebetween said bottom opening 2. The duct 1 further comprises a correspondingly shaped aluminium-made core channel member 6 fully covered except at the portions on the upper surface of the flanges 5 by an insulation sheath 7 of an electrically insulative plastic material such as vinyl chloride, polypropylene and the like. Thus, the insulation sheath 7 is formed on the inner and outer surfaces of the duct 1 with only an exception that the core channel member 6 is exposed at the respective portions on the flanges 5 to define thereat earthing surfaces 8. In this sense, the core channel member 6 serves as an earthing conductor for the electric devices to be coupled to the track. Said core channel member 6 is inserted in the insulation sheath 7 at the time of molding the sheath 7 to provide an intimate and overall adhereing connection between the core channel member 6 and the sheath 7. The insulation sheath 7 on the outer surface of the duct 1 is horizontally knurled for providing secure grip by a person handling the track.

Three main conductors 12 extend along the entire length of the duct 1 in spaced and parallel relation with one another at positions upwardly or inwardly of the duct 1 with one of the conductors 12 located on the top wall 4 and the two others respectively on the sidewalls 3 so that the main conductors 12 are disposed in a trigonous arrangement at any cross section of the duct 1. Integrally projecting from the inner sheath 7 of the duct 1 at the portions corresponding to the main conductors 12 are main support members 14 for holding the main conductors 12, respectively. Each of the main conductors 12 is in the form of an elongated hollow member with an annular cross section the area of which is much larger than that of the auxiliary conductor 11. Each main support member 14 comprises a rail 20 which is C-shaped in cross section with an inwardly oriented slit 21 and is connected integrally to the sheath 7 through a stem 22 extending from the periphery of the rail 20 at the portion diametrically opposed to the slit 21. Each of the main conductors 12 is fitted within each of the C-shaped rails 20 with the portion along the periphery thereof being exposed to the inside of the duct 1 through the slit 21 to define at a contacting surface for electrical connection with the electric device. The contacting surface of the main conductor 12 on each sidewall 3 is arranged substantially in vertical alignment with that of the auxiliary conductor 11 on the same side for assuring convenient access both for the main and auxiliary conductors.

Said auxiliary conductors 11 each being in the form of a solid strip with a rectangular cross section extend likewise along the entire length of the duct 1 in spaced and parallel relation with each other adjacent the bottom opening 2 and held by respective auxiliary support members 13 integrally projecting inwardly from the insulation sheath 7 on the sidewalls 3. As best shown in FIG. 2, each auxiliary support member 13 is H-shaped in cross section with a pair of horizontal legs 15 extending from the sheath 7 and connected by a web 16, the web 16 being offset to a vertical center axis of the duct 1 to be cooperative with the inner end portions of the legs 15 to define a recess for receiving therein the auxiliary conductor 11. The legs 15 of the auxiliary support member 13 on each sidewall 3 terminate at a point just upwardly of the innermost end of the corresponding flange 5 on the same sidewall 3 and are formed at their free end portions with barbs 17 for secure positioning of the auxiliary conductor 11 within the recess.

The stem 22 of the main support members 14 belonging to each sidewall 3 projects from the vertex 23 of said two angularly disposed sides of the hexagon defining each one of the sidewalls 3 in such a way as to afford inside of the corner formed between said angularly disposed sides of the hexagon enough space for the main conductor 12 having a larger transverse dimension or diameter than that of the auxiliary conductor 11. In other words, the transverse distance M between the sidewall 3 and the contacting surface of the main conductor 12 located thereon can be set to be longer than the transverse distance A between the sidewall 3 and that of the auxiliary conductor 11 located thereon, since the auxiliary support member 13 extends horizontally from the sidewall 3 at the portion inwardly displaced from the vertex 23. This construction can successfully reduce the amount of projection of the auxiliary support member 13 to an extent that the member 13 will not become unstable while keeping the contacting surface of the auxiliary conductor 11 substantially in vertical alignment with that of the main conductor 12 on the same side. Without such reduction in the amount of projection of the auxiliary support member 11, or if the sidewall be made vertically flat to have the root portions of the main and auxiliary support members 14 and 13 on the same vertical plane, the auxiliary support member 13 would have to require extra transverse dimension to the above distance A, becoming more unstable due to the increased elasticity of the member resulting from the added amount of projection. Consequently, the above construction is advantageous for stably supporting the auxiliary conductors 11 of less horizontal dimension than that of the main conductors 12 in downwardly displaced relationship from the latter, while arranging the contact surfaces of the main and auxiliary conductors 12 and 11 on the same side in substantially vertical alignment with each other.

Integrally bridging between the main support member 14 on the top wall 4 and the main support member 14 on each of the sidewalls 3 is a connection rib 25 which blends at its ends into peripheries of the adjacent ones of the main support members 14. The connection ribs 25 thus join the members 14 into a consolidated unit for being reinforced by one another so as to stably hold the individual members 14 and the main conductors 12 in positions. With the results of the above, the main and auxiliary 12 and 11 integrally projecting from the insulation sheath 7 can be formed to be less susceptible to fluctuations to thereby hold the corresponding conductors in proper positions, assuring easy and correct coupling thereof between two lengths of the tracks.

Each of said connection ribs 25 comprises a pair of straight segments 26 which project integrally from the peripheries of the C-shaped main support members 14 in a direction normal thereto and are integrally connected by an oblique segment 27 so as to provide a composite cross section of non-linear shape or of generally L-shape with a beveled corner intermediate its length. The above non-linear configuration can provide additional resiliency to the connection ribs 25 so that they are permitted to resiliently spread outwardly in the direction of approaching a straight line while retaining the effect of reinforcing the main support members 14 by one another. Thus, if the track of the present invention should be subjected to such an external force as to deformingly spread the sidewalls 3 together with the main support members 14 formed thereon, the attendant stresses applied to the connection ribs 25 can be well absorbed by the ribs 25 themselves and will not act further upon the remaining main support member 14 on the top wall 4, whereby the main support member 14 on the top wall 4 can be retained in position and protected from being pulled downwardly in the direction of separating the inner sheath 7 integrally formed therewith from the core channel member 6. Such separation of the sheath 7 would lead to the breakage of the sheath 7 and should be eliminated from the viewpoint of providing electrically safe power track of practical utility.

Figure 3A:
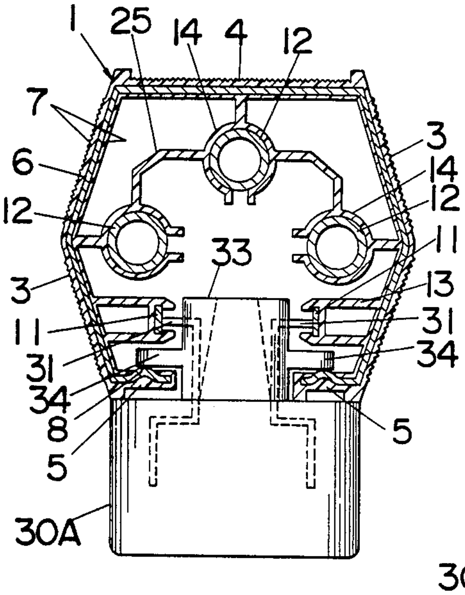
FIGS. 3A and 3B are explanatory views respectively showing the connections between the track and adaptor plugs for electric devices of different current requirements.
Figure 3B:
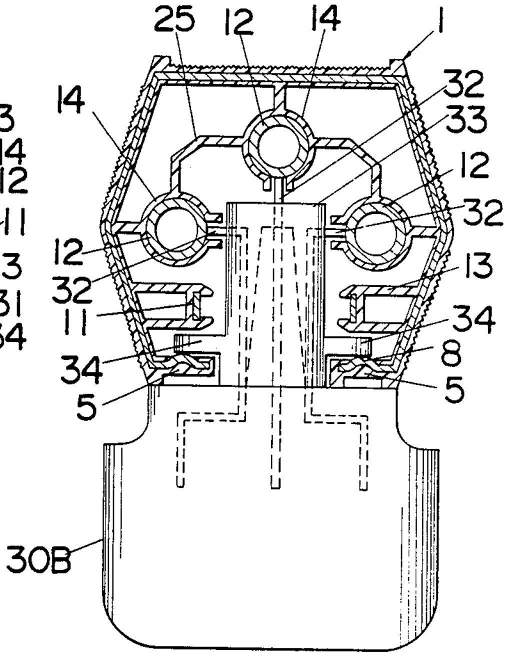

The track thus constructed can be secured to a ceiling by means of hangers 28 and provides a base for mechanically and electrically connecting the various electric devices of different current requirements. For this purpose, two types of adaptor plugs 30A and 30B are employed for feeding powers from the circuits of different current-carrying capacities respectively to the destined devices depending upon the current requirements of the devices, larger or smaller. As shown in FIGS. 3A and 3B, each of the adaptor plugs 30A and 30B is provided at its top with a terminal head 33 from which a pair of horizontal wings 34 extend in opposite directions. The terminal head 33 has an upright vertical axis to be centered with the center axis of the track about which it is rotated 90° for engagement of the wings 34 with the respective inturned flanges 5, at which engagement said earthing surface 8 is in contact with a ground terminal (not shown) provided on either of the wings 34 leading to the grounded side of the electric device. The adaptor plug 30A is for coupling the circuit of smaller current-carrying capacity to the destined device and has a pair of auxiliary terminal blades 31 which project horizontally outwardly from the terminal head 33 in parallel relation with the wings 34 at positions spaced upwardly therefrom by a short distance to be in contacting engagement respectively with the auxiliary conductors 11, as shown in FIG. 3A. The adaptor plug 30B is for coupling the circuit of larger current-carrying capacity to the destined device and has three main terminal blades 32, one projecting upwardly from the terminal head 33 in alignment with the center axis thereof for contacting engagement with the main conductor 12 on the top wall 4 and two others projecting horizontally outwardly from the same in parallel relation with wings 5 at positions spaced upwardly therefrom by a long distance for contacting engagement respectively with the main conductors 12 on the opposite sidewalls 3 of the duct 1. The adaptor plug 30B shown in FIG. 1 is of the type incorporating a circuit breaker for the particular electric device, such as the electric motor and the like of larger current requirements. The adaptor plugs 30A and 30B can be positioned at any convenient location along the length of the track by the slidable engagement of the wings 34 with the inturned flanges 5 of the duct 1 and the exposed bottom opening 2 is preferably closed by a cover plate 9 to be cut to a suitable length, the opposite sides of which are inserted within respective grooves formed between the auxiliary support members 13 and the inturned flanges 5 so as to rest on the latter.

Figure 4:
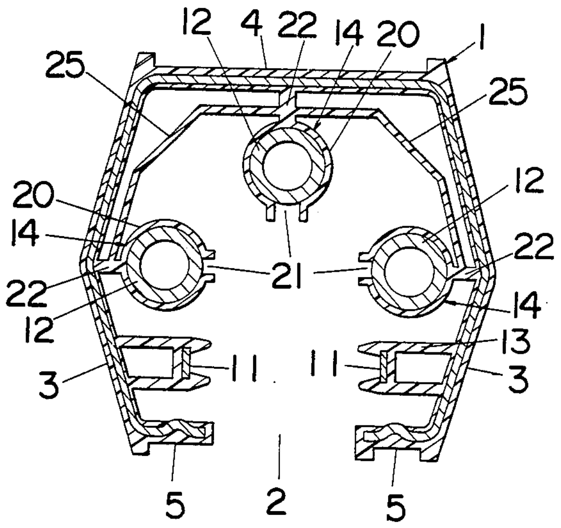
FIG. 4 is a cross section of a modification of the above track.

FIG. 4 shows a modification of the above first embodiment which is similar in construction thereto except for the particular configuration of the connection rib 25. In this modification, each connection rib 25 blends at its ends into the stems 22 of the main support members 22, and not into the C-shaped rails 20 as in the first embodiment. The stress absorbing effect of the connection ribs 25 of course remains effective in this modification.

Figure 5:
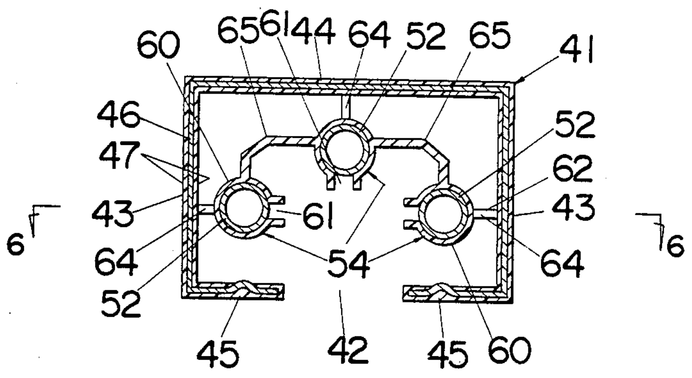
FIG. 5 is a cross section of an electric power distribution track in accordance with a second embodiment of the present embodiment.

Referring to FIG. 5, there is shown a second preferred embodiment of the present invention, in which are included only main conductors 52 of the same construction as in the above first embodiment. The track of this embodiment comprises a duct 41 of a generally rectangular cross section having a top wall 44, opposite sidewalls 43, and a lengthwise bottom opening 42. Provided at the lower ends of the sidewalls 43 are inturned flanges 45 which project toward each other to define therebetween said bottom opening 43. Likewise in the first embodiment, the duct 41 is composed of a correspondingly shaped metal-made core channel member 46 covered by an insulation sheath 47 of a suitable plastic material. Support members 54 for the respective conductors 52 integrally project from the inner surface of the insulation sheath 47 at positions respectively on the opposite sidewalls 43 and the top wall 44, each support member 54 comprising a C-shaped rail 60 with an inwardly oriented slit 61 and a stem 62 extending from the periphery of the rail 60 at the position diametrically opposed to the slit 61 and joining the insulation sheath 47 at right angle thereto. Thus, the conductors 52 are received within the respective rails 50 each with the portion of the periphery being exposed to the inside of the duct 41 through the slit 61 so as to define thereat a contact surface for electrical connection with the terminal blade of an adaptor plug of the like construction as in the previous embodiment. Also in this embodiment, the support member 54 on the top wall 4 is integrally connected to the support member 54 on each of the sidewalls 43 by a connection rib 65 of the identical configuration to that shown in the first embodiment.

Figure 6:
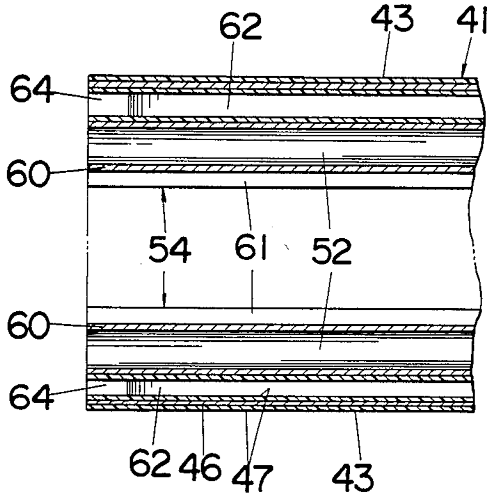
FIG. 6 is a transverse section taken along line 6—6 of FIG. 5.
Figures 7, 8A, 8B:
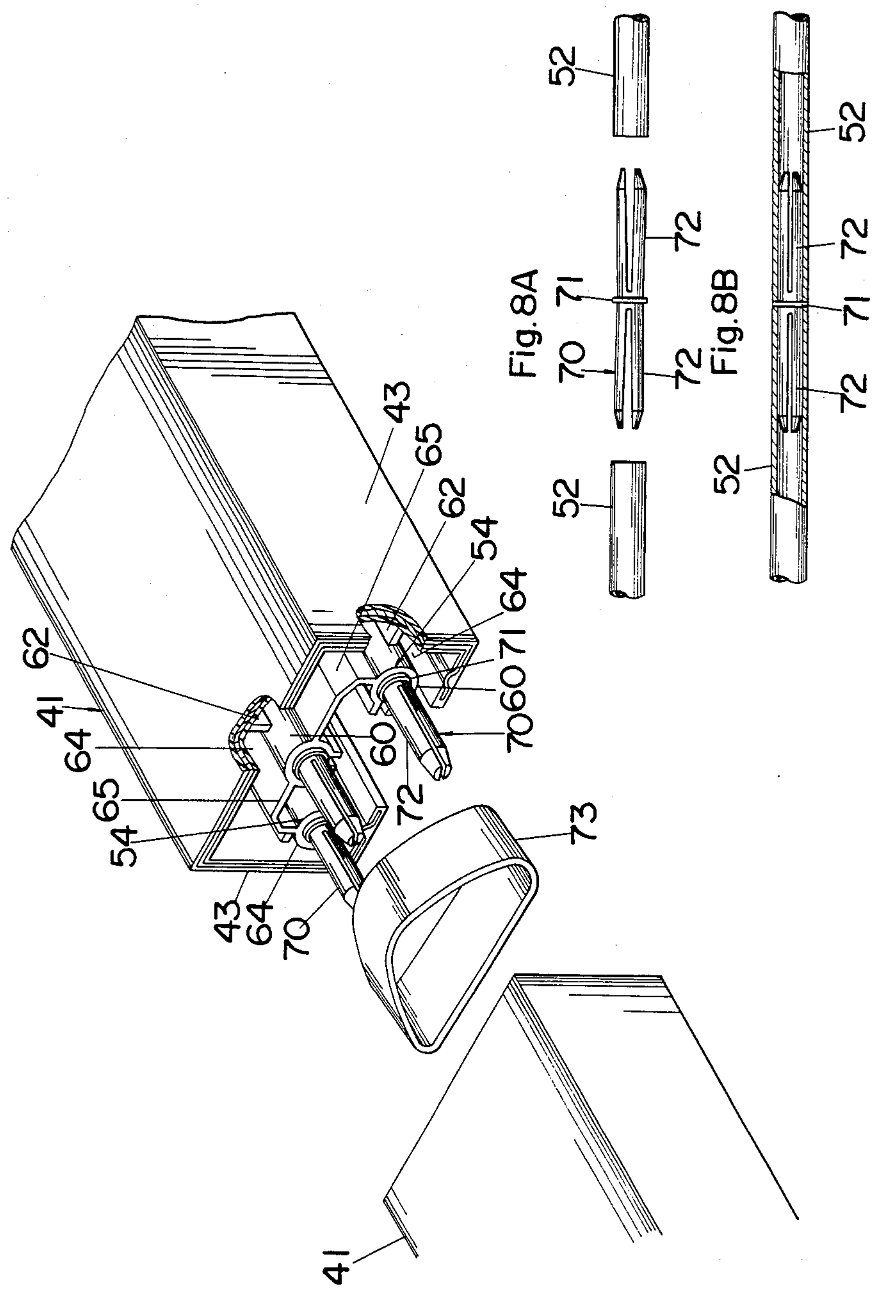
FIG. 7 is a perspective view partly in section of the above track showing an insulation sleeve to be interposed between the two lengths of the tracks.
FIGS. 8A and 8B are respectively explanatory views showing the connection between the conductors of the two lengths of the tracks.

At the longitudinal end or end face portions of the duct 41, each stem 62 is notched to a certain depth, as best shown in FIGS. 6 and 7, so as to define thereat a recess 64, by which the creepage distance of insulation between the corresponding conductor 52 and the metal core channel member 46 is further elongated. This is advantageous in reducing the amount of inward projection of each support member 54 to a minimum, while providing enough creepage distance of insulation at the end face portions of the track, which gives rise to a compact construction of the track of the type having the conductors held by the supporting members integrally projecting from the insulation sheath of the duct.

Interconnection between the conductors 52 of the lengths of adjacently disposed tracks can be made by the use of a corresponding number of connection pins 70 each having a stop ring 71 intermediate its ends and defining at portions both sides thereof insertion split ends 72. The insertion split ends 72 are forcibly inserted in the corresponding conductors 52 of the adjacent tracks until the stopper ring 71 abuts against the end faces of the conductors 52, as shown in FIGS. 8A and 8B. An insulation sleeve 73 of a generally triangular loop is interposed between the adjacent tracks with the portions on both sides thereof being inserted respectively in said recesses 64 at the opposed end portions of the adjacent track so that it is positioned within the circumference of the track in such a manner as to enclose the end portions of all the conductors 52 therein for insulatively separating them from the core channel members 46 at the connection of the track, thus ensuring electrical insulation at the connection of the track between each of the conductors 52 and the core channel member 46.

Figure 9:
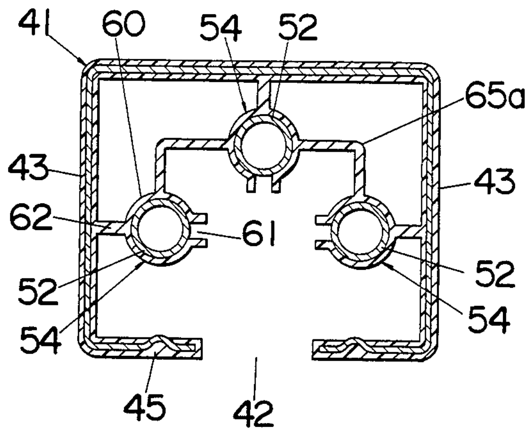
FIGS. 9 and 10 are cross sections respectively of modifications of the second embodiment of FIG. 5.
Figure 10:
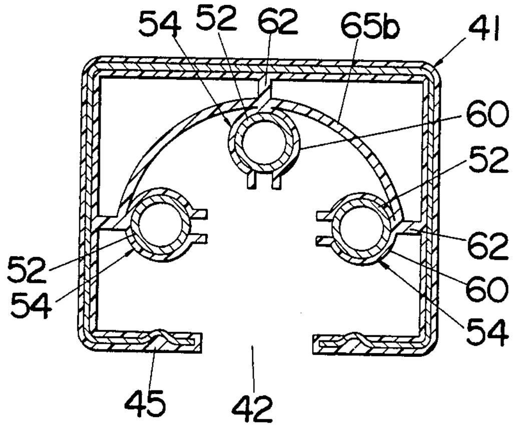

Referring to FIGS. 9 and 10, there are shown respectively modifications of the second embodiment of FIG. 5 which are similar in construction thereto but have connection ribs of configurations somewhat different from that in the above embodiment. In the modification of FIG. 9, the connection rib **65*a* is formed to have a L-shaped cross section composed of a pair of legs each joining the rail 60 of each one of the adjacent support members 54. In the modification of FIG. 10, the connection rib 65*b* is formed to have an arcuate cross section extending between the stems 62 of the adjacent support members 54. The ribs 65*a* and 65*b*** thus formed are also of non-linear in cross section and therefore retain the above stress absorbing effect, as described with regard to the first embodiment.

What is claimed is:

1. An electric power distribution track comprising:

an elongated duct having the cross section of a generally downwardly disposed U-shaped configuration with top wall, a pair of lateral sidwalls, and a lengthwise bottom opening, said duct including a correspondingly shaped electrically grounded metallic core channel member covered by an insulation sheath of an electrically insulative plastic material;

a plurality of spaced apart conductors extending longitudinally along the duct at positions spaced inwardly from the interior surface of the sheath with at least one of the conductors supported on the top wall and at least one of the conductors on each of the opposite sidewalls;

a corresponding number of support members integrally formed with said sheath to project inwardly of the duct for receiving said three conductors at the inward end portions of the support members;

each of the conductors being shaped as an elongated hollow member with an annular cross section, and each of the support members having at its inner end portion a rail of C-shaped cross section with an inwardly oriented slit, said conductor being snugly received within the rail and exposed to the inside of the duct through the slit with the support extending from the side diametrically opposite from the slit;

connection ribs each integrally bridging between the support member on the top wall and the support member on each of said sidewalls for integral connection therebetween, each of said connection ribs extending in a non-linear manner between the adjacent ones of the support members such that the connection ribs are capable of resiliently stretching when the track is subjected to such an external force to deformingly spread outwardly the sidewalls and the support members belonging thereto;

a pair of upwardly facing earthing surfaces in electrical contact with said core channel, one on each side of said lengthwise bottom opening and extending parallel to said conductors so that an adaptor plug inserted within said lengthwise bottom opening can be positioned to contact said earthing surfaces and said at least one conductor supported on the top wall so as to exert a downward force from said at least one conductor and thus to cause a better contact with said earthing surface.

2. The electric power distribution track as set forth in claim 1, wherein each of said connection ribs comprises two straight segments integrally connected by an oblique segment arranged in angled relationship with respect to the straight segments, said straight segments integrally extending from the adjacent ones of the support members and the oblique segment defining a bevelled corner between the straight segments.

3. The electric power distribution track as set forth in claim 1, wherein said connection ribs extend in an arcuate manner between the adjacent ones of the support members.

4. The electric power distribution track as set forth in claim 1, wherein each of said support members comprises a rail which holds each one of the conductors and is connected integrally to the insulation sheath of the duct through a stem projecting on the inner insulation sheath such that the rail is spaced inwardly therefrom by the length of the stem, the stem at either longitudinal end face of the track being notched to define thereat a recess between the metal core channel member and each of the conductors at that end face of the track to facilitate the installation of an insulation sleeve between adjacent tracks which are positioned end to end.

5. The electric power distribution track as set forth in claim 1, further including a pair of auxiliary conductors extending along the length of the track at positions downwardly displaced from said conductors, said auxiliary conductors being supported respectively by auxiliary support members which are integral with said insulation sheath and project inwardly therefrom adjacent the bottom opening, said auxiliary conductors being sized to have a smaller cross sectional area than that of said conductors such that the auxiliary conductors are cooperative to form a power distribution circuit of smaller current-carrying capacity while said conductors are cooperative to form a power distribution circuit of larger current-carrying capacity.

6. An electric power distribution track comprising:

an elongated duct having the cross section of an inverted U-shaped configuration with a top wall, a pair of lateral sidewalls, and a lengthwise bottom opening; said duct having an electrically grounded metal member extending longitudinally along the duct in at least the portion thereof adjacent the lengthwise bottom opening and said duct having a covering of plastic insulation sheath of electrically insulative plastic material;

a plurality of spaced apart conductors extending longitudinally along the duct at positions spaced inwardly from the interior surface of the duct with at least one of said conductors carried along said top wall;

insulating support members for the conductors and secured to the interior surface of the duct;

an upwardly facing earthing surface formed by a portion of the metal member protruding through the plastic insulation sheath and in electrical contact with said grounded metal member and extending along at least one side of said lengthwise bottom opening parallel to said conductors so that an adaptor plug inserted within said lengthwise bottom opening can be positioned to contact both said earthing surface and said at least one conductor carried along said top wall so as to exert a downward force from said at least one conductor and thus to cause a better contact with said earthing surface.

7. The track of claim 6 in which the metal member extends on both sides of the lengthwise bottom opening.

8. The track of claim 6 in which the sidewalls of the elongated duct have edge portions at an angle thereto which form a generally flat surface and define the sides of the lengthwise bottom opening.

9. The track of claim 8 in which the metal member extends along the sidewalls of the duct and said edge portions.

10. An electric power distribution track comprising:

an elongated duct having the cross section of a generally downwardly disposed U-shaped configuration with a top wall, a pair of lateral sidewalls, and a lengthwise bottom opening, said duct including a correspondingly shaped electrically grounded metallic core channel member covered by an insulation sheath of an electrically insulative plastic material;

a plurality of spaced apart conductors extending longitudinally along the duct at positions spaced inwardly from the interior surface of the sheath with at least one of the conductors supported on the top wall and at least one of the conductors on each of the opposite sidewalls;

a corresponding number of support members integrally formed with said sheath to project inwardly of the duct for receiving said three conductors at the inward end portions of the support members;

each of the conductors being shaped as an elongated hollow member with an annular cross section, and each of the support members having at its inner end portion a rail of C-shaped cross section with an inwardly oriented slit, said conductor being snugly received within the rail and exposed to the inside of the duct through the slit with the support extending from the side diametrically opposite from the slit;

connection ribs each integrally bridging between the support member on the top wall and the support member on each of said sidewalls for integral connection therebetween, each of said connection ribs extending in a non-linear manner between the adjacent ones of the support members such that the connection ribs are capable of resiliently stretching when the track is subjected to such an external force to deformingly spread outwardly the sidewalls and the support members belonging thereto;

a pair of upwardly facing earthing surfaces formed by a portion of the metallic core channel protruding through said insulation sheath, one earthing surface on each side of said lengthwise bottom opening and extending parallel to said conductors so that an adaptor plug inserted within said lengthwise bottom opening can be positioned to contact said earthing surfaces and said at least one conductor supported on the top wall so as to exert a downward force from said at least one conductor and thus to cause a better contact with said earthing surface.

11. The track of claim 10 in which said protruding portion is a longitudinally extending hump in the core channel adjacent each edge of the lengthwise bottom opening.

* * * * *